(12) United States Patent
Deng et al.

(10) Patent No.: US 11,823,102 B2
(45) Date of Patent: Nov. 21, 2023

(54) ALLOCATING SHOPPERS FOR ORDER FULFILLMENT BY AN ONLINE CONCIERGE SYSTEM ACCOUNTING FOR VARIABLE NUMBERS OF SHOPPERS ACROSS DIFFERENT TIME WINDOWS AND VARYING CAPABILITIES FOR FULFILLING ORDERS

(71) Applicant: Maplebear, Inc., San Francisco, CA (US)

(72) Inventors: Houtao Deng, Sunnyvale, CA (US); Ji Chen, Mountain View, CA (US); Christopher Shey-Tau Sun, Atherton, CA (US); Yile Liu, Sunnyvale, CA (US); Yijia Chen, Oakland, CA (US)

(73) Assignee: Maplebear, Inc., San Francisco, CA (US)

( * ) Notice: Subject to any disclaimer, the term of this patent is extended or adjusted under 35 U.S.C. 154(b) by 104 days.

(21) Appl. No.: 17/308,996

(22) Filed: May 5, 2021

(65) Prior Publication Data

US 2022/0358443 A1     Nov. 10, 2022

(51) Int. Cl.
*G06Q 10/0631*     (2023.01)
*G06Q 10/0875*     (2023.01)

(52) U.S. Cl.
CPC ........ *G06Q 10/063112* (2013.01); *G06Q 10/06315* (2013.01); *G06Q 10/0875* (2013.01)

(58) Field of Classification Search
CPC ........ G06Q 30/0641; G06Q 30/0635; G06Q 30/0633; G06Q 30/0603; G06Q 30/0601;

(Continued)

(56) References Cited

U.S. PATENT DOCUMENTS

| 7,295,990 B1 * | 11/2007 | Braumoeller | G06Q 10/063 |
| | | | 705/28 |
| 8,560,394 B2 * | 10/2013 | Martucci | G06Q 10/087 |
| | | | 455/414.3 |

(Continued)

OTHER PUBLICATIONS

Mixson, Elizabeth, Instacart: Delivering Incredible Customer Experiences with Advanced Analytics and Machine Learning AI Data & Analytics Network, Mar. 26, 2021 (Year: 2021).*

(Continued)

*Primary Examiner* — Scott L Jarrett
(74) *Attorney, Agent, or Firm* — Fenwick & West LLP

(57) ABSTRACT

An online concierge system allows users to order items within discrete time intervals later than a time when an order was received. Each order may require a different set of characteristics for fulfilment by shoppers. Because different shoppers may have different capabilities, it is most efficient to reserve shoppers with specialized characteristics for orders that require them. The online concierge system maintains a set of hierarchical structures for different characteristics of shoppers, with each level in a hierarchical structure having a value. To select a shopper to fulfill an order, the online concierge system scores identifies groups of shoppers having characteristics capable of fulfilling the order based on levels in the hierarchical structure for each characteristic of a group. A shopper from a group having a minimum score is selected to fulfill the order.

22 Claims, 6 Drawing Sheets

(58) Field of Classification Search
CPC ..... G06Q 10/063116; G06Q 10/06313; G06Q 10/103; G06Q 10/083; G06Q 30/0617; G06Q 30/0639; G06Q 10/063112; G06Q 50/28
See application file for complete search history.

(56) References Cited

U.S. PATENT DOCUMENTS

| | | | | |
|---|---|---|---|---|
| 9,665,899 | B1* | 5/2017 | Nair | G06Q 30/0639 |
| 9,928,531 | B2* | 3/2018 | McCarthy | G06Q 30/0617 |
| 10,127,595 | B1* | 11/2018 | Hipschman | G06Q 50/12 |
| 10,242,336 | B1* | 3/2019 | Agarwal | G06Q 10/083 |
| 10,467,563 | B1* | 11/2019 | Mo | G06Q 10/08355 |
| 10,592,964 | B2* | 3/2020 | High | G06Q 10/083 |
| 10,657,580 | B2* | 5/2020 | Kumar | G06Q 30/0635 |
| 10,679,170 | B2* | 6/2020 | Putcha | G06Q 30/0202 |
| 10,699,328 | B2* | 6/2020 | Rajkhowa | G06Q 30/0635 |
| 10,832,209 | B2* | 11/2020 | Rajkhowa | G06Q 10/06316 |
| 11,120,378 | B1* | 9/2021 | Willard, III | G06Q 10/083 |
| 11,144,866 | B2* | 10/2021 | Swartz | G06Q 20/12 |
| 11,158,017 | B2* | 10/2021 | Yao | G06Q 10/063112 |
| 11,176,513 | B1* | 11/2021 | Park | G06Q 10/087 |
| 11,341,554 | B1* | 5/2022 | Sturm | G06Q 30/0235 |
| 11,403,584 | B2* | 8/2022 | Srinivasan | G06Q 20/208 |
| 11,436,621 | B2* | 9/2022 | Bronicki | G06Q 30/018 |
| 11,443,258 | B2* | 9/2022 | Des Ligneris | G06Q 10/08355 |
| 2002/0075325 | A1* | 6/2002 | Allor | G06F 3/0481 |
| | | | | 715/853 |
| 2002/0116279 | A1* | 8/2002 | Nobilo | G06Q 30/06 |
| | | | | 705/26.8 |
| 2007/0136149 | A1* | 6/2007 | Woodward | G06Q 10/087 |
| | | | | 705/26.81 |
| 2014/0074743 | A1* | 3/2014 | Rademaker | G06Q 30/0601 |
| | | | | 705/334 |
| 2014/0279294 | A1* | 9/2014 | Field-Darragh | G06Q 30/0282 |
| | | | | 705/28 |
| 2015/0307278 | A1* | 10/2015 | Wickham | G05B 13/047 |
| | | | | 700/216 |
| 2016/0086255 | A1 | 3/2016 | Sainfort et al. | |
| 2017/0011449 | A1* | 1/2017 | Mueller | G06Q 30/0635 |
| 2017/0091880 | A1* | 3/2017 | Krishnan | G06Q 50/12 |
| 2018/0268462 | A1* | 9/2018 | Brown | G01S 19/13 |
| 2019/0114583 | A1* | 4/2019 | Ripert | G06Q 10/087 |
| 2020/0134762 | A1* | 4/2020 | Chen | G06Q 50/28 |
| 2020/0272970 | A1* | 8/2020 | Willard, III | G06Q 10/0875 |
| 2021/0012277 | A1 | 1/2021 | Song | |
| 2021/0269244 | A1* | 9/2021 | Ahmann | B65G 1/0492 |
| 2022/0207436 | A1* | 6/2022 | Maruoka | G06Q 30/0601 |
| 2022/0281687 | A1* | 9/2022 | Voorhies | B65G 1/1378 |

OTHER PUBLICATIONS

Rao, Sharath et al., The Algorithms that make Instacart roll Spectrum IEEE, vol. 36, Mar. 2021 (Year: 2021).*
Chen, Ji, Instacart Anytime: A Data Science Paradigm Instacart, Feb. 6, 2018 (Year: 2018).*
PCT International Search Report and Opinion, PCT Application No. PCT/US22/27096, dated Aug. 9, 2022, 10 pages.

* cited by examiner

ALLOCATING SHOPPERS FOR ORDER FULFILLMENT BY AN ONLINE CONCIERGE SYSTEM ACCOUNTING FOR VARIABLE NUMBERS OF SHOPPERS ACROSS DIFFERENT TIME WINDOWS AND VARYING CAPABILITIES FOR FULFILLING ORDERS

BACKGROUND

This disclosure relates generally to ordering items through an online concierge system, and more specifically to allocation of shoppers for fulfilling orders accounting for variable availability of shoppers over time and varying capabilities for fulfilling orders.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems maintain discrete time windows during which orders are fulfilled, and a user selects a specific time window for an order to be fulfilled by delivery to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

To fulfill orders received from users, the online concierge system estimates numbers of shoppers available for fulfilling orders during different time intervals and allocates a specific amount of the estimated number of shoppers as available to fulfill orders. The specific amount of the estimated shoppers available to fulfill orders during a time window is often less than the total number of estimated number of shoppers available to fulfill orders, allowing an online concierge system to maintain an amount of estimated shoppers for fulfilling orders within the specified time interval of times when the order is placed. While allocating a specific amount of an estimated number of shoppers for fulfilling orders scheduled for specific time windows allows the online concierge system to maintain resources to more rapidly fulfill short-term orders, significant increases in numbers of orders to be fulfilled occupies the specific amount or estimated shoppers available during multiple time windows, limiting time windows during which users may schedule orders for fulfillment.

Additionally, certain orders have restrictions on fulfillment that limit their fulfillment to shoppers having certain characteristics (e.g., membership to a warehouse, authorization to purchase certain items, authorization to deliver certain items), limiting numbers of shoppers available for fulfilling those certain orders. Such restrictions on order fulfillment affect allocation of shoppers for fulfilling orders during different orders. For example, allocating a shopper having characteristics capable for fulfilling orders having one or more restrictions during a time interval to fulfill an order without restrictions prevents an online concierge system from subsequently fulfilling an order during the time interval having one or more of the restrictions, which may delay fulfillment of the order having the one or more restrictions. Conventional online concierge systems inefficiently account for restrictions for order fulfillment when allocating shoppers for fulfilling orders during time intervals, limiting their ability to fulfill received orders having one or more restrictions on fulfillment.

Further, conventional online concierge systems hard-code restrictions for assigning shoppers to different orders, maintaining different rules for different restrictions. While this allows conventional online concierge systems to account for restrictions for characteristics of shoppers capable of fulfilling orders, such hard-coding of restrictions for shoppers capable of fulfilling orders is unable to efficiently account for changes in restrictions for shoppers capable of fulfilling orders. For example, adding restrictions for shoppers capable of fulfilling certain orders in conventional online systems involves creating and storing new-hard coded rules. Similarly, changing certain restrictions on fulfillment of orders may involve updating or modifying multiple hard-coded rules applying to different types of orders, increasing complexity and timing for such updates. Thus, such hard-coding rules for assigning shoppers to different orders is inefficient and poorly scalable as order requirements or shopper characteristics change, preventing conventional online concierge systems from most efficiently implementing changes to characteristics of shoppers capable of fulfilling different orders.

SUMMARY

An online concierge system maintains a plurality of discrete time intervals during which orders received by the online concierge system are fulfilled. For example, the online concierge system maintains multiple two-hour intervals during a day or another duration for fulfilling orders. This allows a user of the online concierge system to select a discrete time interval for an order provided by the user so that items included in the order are delivered to the user at a time within the selected discrete time interval. By selecting a discrete time interval, a user of the online concierge system can schedule delivery of items in the order at a future time within the selected discrete time interval, allowing the user to tailor when the order is fulfilled.

From previously fulfilled orders, the online concierge system determines an estimated number of shoppers available to fulfill orders during each of at least a set of the discrete time intervals. For example, the online concierge system determines an estimated number of shoppers available to fulfill orders during each of the discrete time intervals. In various embodiments, the online concierge system applies a trained machine learned model to historical numbers of shoppers available to fulfill orders, or who fulfilled orders, at different discrete time intervals and characteristics of the discrete time interval (e.g., weekday or weekend, time of day, day of the week, day of the month, etc.), as well as a geographic location. To determine the estimated number of shoppers, the trained machine learned model receives a discrete time interval and a geographic location and determines the estimated number of shoppers available to fulfill orders during the discrete time interval based on historical numbers of shoppers available during prior time intervals corresponding to the discrete time interval, as well as the geographic location. The trained machine learned model for determining the estimated number of shoppers during a discrete time interval may be trained using any suitable method or combination of methods (e.g., supervised learning, unsupervised learning, semi-supervised learning, etc.). In various embodiments, the online concierge system determines an estimated number of shoppers available to fulfill orders during each discrete time interval of a set. For example, the set of discrete time intervals includes each discrete time interval within the maximum interval from a current time.

The online concierge system receives an order from a user that includes one or more items for purchase, identifies a warehouse from which items of the order are to be obtained, and identifies a discrete time interval for fulfilling the order. Based on the warehouse and items in the order, fulfillment of the order may be limited to shoppers having one or more characteristics. For example, the order includes an item (e.g., alcohol, medication) for which a shopper is required to have a stored authorization or approval by the online concierge system to purchase or to deliver to a user. As another example, the order identifies a warehouse accessible to shoppers having a membership or affiliation with the warehouse to purchase items from the warehouse. In other embodiments, the online concierge system restricts fulfillment of orders to shoppers having any suitable characteristics or combinations of characteristics.

From the items in the order and the warehouse identified by the order, the online concierge system applies one or more tags to the order. The tags applied to the order identify attributes of the order. The attributes of the order are determined from the warehouse specified by the order and items included in the order. The attributes of the order identify characteristics needed by a shopper to fulfill the order. Each tag corresponds to a different attribute of the order that identifies a characteristic of a shopper in some embodiments. Hence, for the online concierge system to select a shopper to fulfill the order, the shopper has characteristics satisfying the tags applied to the order. For example, if an order identifies a warehouse requiring a membership to be accessed, a tag applied to the order identifies the warehouse and the membership. As another example, if an order includes alcohol, a tag applied to the order indicates that a shopper be authorized by the online concierge system to purchase or to deliver alcohol. In another example, an order identifies a warehouse requiring a membership to be accessed and includes alcohol, so the online concierge system applies a tag to the order indicating that the shopper be authorized by the online concierge system to purchase alcohol or to deliver alcohol and a tag identifying the warehouse and the membership to the warehouse. Hence, any number of tags may be applied to the order depending on the warehouse identified by the order and items included in the order.

The online concierge system maintains a tree structure, or other hierarchical structure, for each tag, with the tree structure for a tag encoding capability of shoppers to fulfill orders to which a tag is applied. The tree structure hierarchically arranges characteristics of shoppers for fulfilling orders corresponding to the tag, with different levels of the tree structure corresponding to different characteristics of the shopper. In various embodiments, shoppers having characteristics in a level of the tree structure for a tag are capable of fulfilling orders that shoppers in a higher level of the tree structure are capable of fulfilling, but are unable to fulfill orders that shoppers in a lower level of the tree structure are capable of fulfilling. For example, a tree structure corresponding to membership in a warehouse includes a root level and a lower level for shoppers who are not members of the warehouse. An additional lower level is lower than the lower level and corresponds to shoppers who are members of the warehouse In this example, shoppers who are members of the warehouse are capable of purchasing items from the warehouse and from warehouses that do not require a membership, while shoppers who are not members of the warehouse cannot purchase items from the warehouse. As another example, a tag corresponding to purchase of an item requiring authorization by the online concierge service to purchase or to deliver (e.g., alcohol or prescription medication) includes a root level and a lower level for shoppers who are not authorized by the online concierge system to purchase the specific item. An additional lower level is lower than the lower level and corresponds to shoppers who are authorized by the online concierge system to purchase or to deliver the specific item. In this example, a shopper who is authorized to purchase or to deliver the specific item (e.g., alcohol) is also capable of making purchases that shoppers who are not authorized to purchase or to deliver the specific item, while a shopper who is not authorized by the online concierge system to purchase or to deliver the specific item is unable to fulfill orders including the specific item. Each level in the hierarchy is also associated with a value, with lower levels in the tree structure having higher values in some embodiments, reflecting the ability of shoppers with characteristics in lower levels of the tree structure to also fulfill orders capable of being fulfilled by shoppers in higher levels of the tree structure. Thus, a higher value for a characteristic of a shopper indicates that a shopper with the characteristic is capable of fulfilling orders having a broader range of attributes.

Maintaining the tree structures for different tags allows the online concierge system to more efficiently adjust capabilities of shoppers for fulfilling orders. For example, to add one or more characteristics to a tag, the online concierge system adds another characteristic to a level of the tree structure for the tag or adds an additional level to the tree structure for the tag, allowing the additional one or more characteristics to be considered without affecting the existing characteristics affecting fulfillment of orders associated with the tag. Similarly, the online concierge system is capable of more readily adjusting how a characteristic affects capability of a shopper for fulfilling orders. For example, the online concierge system increases or decreases a value of a level in a tree structure corresponding to a tag to adjust an effect of a characteristic corresponding to the level in shopper capability for fulfilling orders. In contrast to conventional techniques, where such changes would involve creation of new rules for shopper capabilities to fulfill orders, the tree structures can be readily modified, with the modified tree structures able to be quickly used for allocating shoppers to fulfill orders. Thus, the tree structures simplify modification of how characteristics of shoppers affect capability for fulfilling orders by allowing modification of one or more tree structures rather than reconfiguration of multiple hard-coded rules and relationships between characteristics corresponding to different hard-coded rules.

The online concierge system determines one or more combinations of characteristics of shoppers capable of fulfilling the order and accesses tree structures corresponding to each characteristic of shoppers included in at least one combination. For example, for an order identifying a warehouse that does not require a membership to access and does not include a specific item for which a shopper be authorized by the online concierge system to purchase or to deliver, the online concierge system determines that shoppers who are not members of a warehouse and shoppers who are members of a warehouse are capable of fulfilling the order and determines that shoppers who are authorized to purchase or to deliver the specific item by the online concierge system as well as shoppers who are not authorized to purchase or to deliver the specific item form the online concierge system are capable of fulfilling the order. In the preceding example, the online concierge system accesses a tree structure corresponding to membership in the warehouse and one or more tree structures for authorization by the online concierge system to purchase or to deliver one or more specific items. In another example, an order identifies a warehouse that requires a membership and a specific item requiring authorization by the online concierge system to purchase or to deliver, so the online concierge system determines that shoppers who are members of the warehouse and who are authorized by the online concierge system to purchase or to deliver the specific item are capable of fulfilling the order; thus, the online concierge system accesses a tree structure for membership in the warehouse and a tree structure for authorization by the online concierge system to purchase or to deliver the specific item.

The tree structures corresponding to different tags allows the online concierge system to better account for combinations of characteristics of shoppers when allocating shoppers to fulfill an order. Conventional techniques for hard coding rules for allocating shoppers to orders are cumbersome and inefficient to implement to account for relative capabilities of shoppers with different characteristics to fulfill orders, with many conventional rules focusing on effect of a specific characteristic of a shopper in capability of the shopper fulfilling orders. The tree structures maintained by the online concierge system allow the online concierge system to more readily account for effects of multiple characteristics of a shopper on the shopper's capability to fulfill orders, providing a more efficient and accurate assessment of a shopper's capability for fulfilling various orders.

Additionally, the online concierge system determines a number of estimated shoppers available to fulfill orders during the discrete time interval identified by the order from the estimated shoppers determined to be available to fulfill orders during the discrete time interval. The online concierge system includes each estimated shoppers available to fulfill orders during the discrete time interval into a group based on characteristics of each estimated shopper available to fulfill an order during the discrete time interval. Each group corresponds to a combination of characteristics of a shopper. For example, a group corresponds to a shopper being a member of a warehouse identified by the order and being authorized by the online concierge system to purchase or to deliver a specific item; another group corresponds to a shopper not being a member of the warehouse identified by the order and being authorized by the online concierge system to purchase or to deliver a specific item, while another group corresponds to a shopper being a member of the warehouse and not being authorized by the online concierge system to purchase or to deliver the specific item. Additionally, each group has a score based on the combination of characteristics corresponding to the group, with the score determined from values of levels in obtained tree structures corresponding to the tags applied to the order. In various embodiments, the online concierge system identifies a level in a tree structure for a tag applied to the order that includes characteristics of shoppers capable of fulfilling the order and retrieves a value corresponding to the identified level. The online concierge system combines values of levels in each tree structure corresponding to a tag applied to the order including a characteristics of shoppers in a group to determine the score for the group. For example, the score for a group is a product of values of levels in each tree structure corresponding to a tag applied to the order including a characteristics of shoppers in the group. However, in other embodiments, the online concierge system generates the score for a group by combining values of levels in each tree structure corresponding to a tag applied to the order including a characteristics of shoppers in the group in any suitable manner in other embodiments.

If the online concierge system modifies a tree structure the online concierge system, when the online concierge system subsequently generates an updated score for each group including a tag corresponding to the modified tree structure. The online concierge system uses the updated scores for the groups including the tag corresponding to the modified tree structure when selecting shoppers to fulfill orders associated with the tag. For example, the online concierge system adds one or more additional characteristics to the modified tree structure to identify other characteristics of the shopper capable of fulfilling the order including the tag by adding the additional characteristics to a level of the tree structure or by adding one or more levels to the tree structure. Similarly, the online concierge system may modify the tree structure by removing characteristics from one or more levels of the tree structure. In another example, the online concierge system increases or decreases a value of a level in the tree structure to reflect a change in capability of shoppers having characteristics corresponding to the level of the tree structure to fulfill orders. By generating scores for groups based on values of levels of tree structures corresponding to tags applied to the orders, the online concierge system is capable of quickly accounting for changes in order fulfillment for characteristics of shoppers through changes to the tree structures and using the modified scores for groups from the changes in the tree structures, reducing time and computational resources for the online concierge system to account for changes in characteristics of shoppers capable of fulfilling orders.

The online concierge system identifies one or more groups having a combination of characteristics capable of fulfilling the order from the tags applied to the order and selects an estimated shopper from an identified group having a minimum score to fulfill the order. As shoppers with characteristics in lower levels of tree structures, which have higher values in the tree structures, are also capable of fulfilling orders that shoppers with characteristics in higher levels of tree structures are capable of fulfilling, the shoppers with characteristics in lower levels of tree structures are capable of fulfilling a wider range of orders. Hence, estimated shoppers in groups with higher scores are shoppers with a greater capability of fulfilling orders to which different tags or combinations of tags are applied. By selecting an estimated shopper from an identified group with a minimum score to fulfill the order, the online concierge system initially selects estimated shoppers with more limited capabilities to fulfill orders. This allows the online concierge system a greater flexibility in fulfilling subsequent orders by reserving estimated shoppers in groups with higher scores, corresponding to greater capabilities to fulfill orders, for subsequent selection to fulfill other orders.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
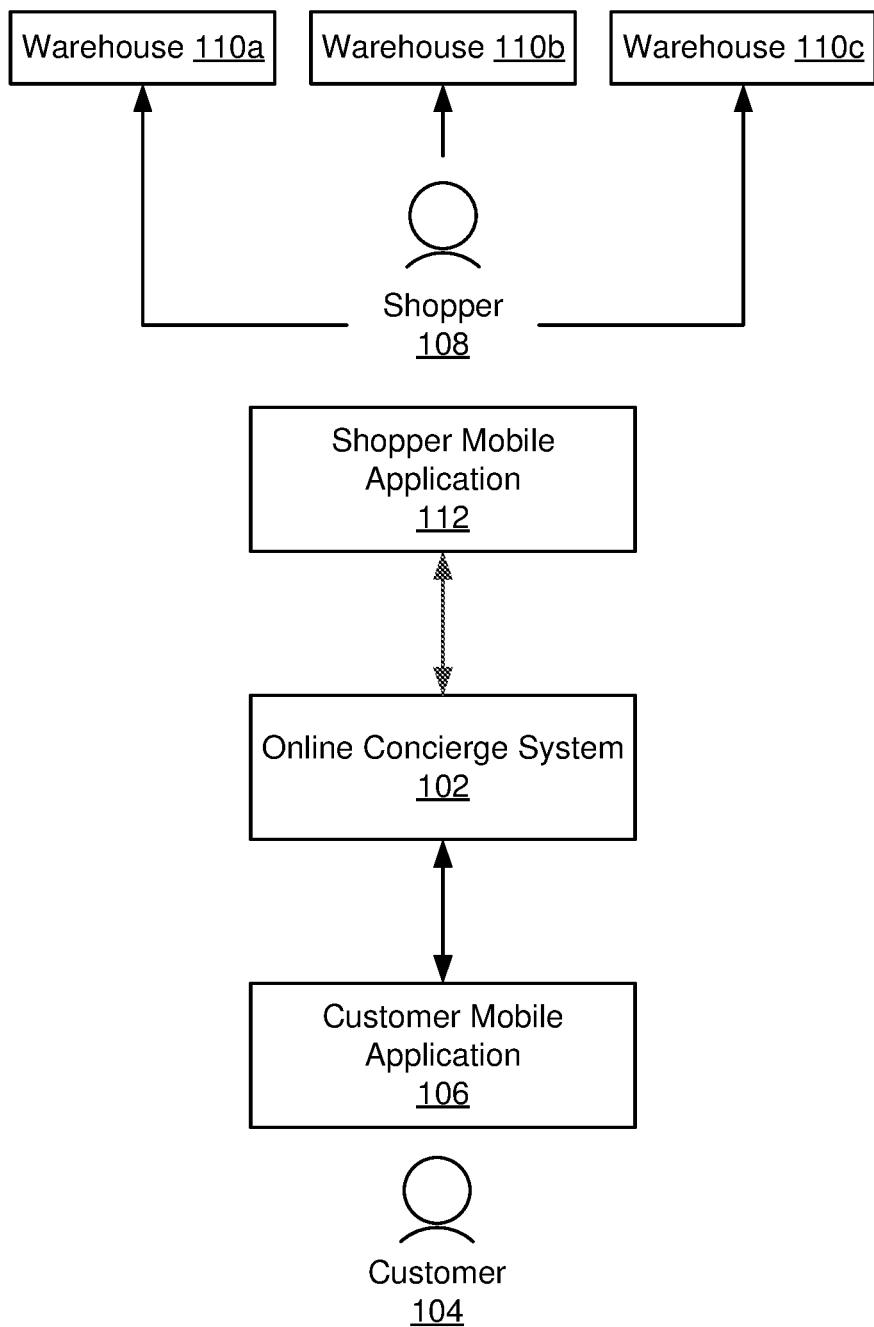
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
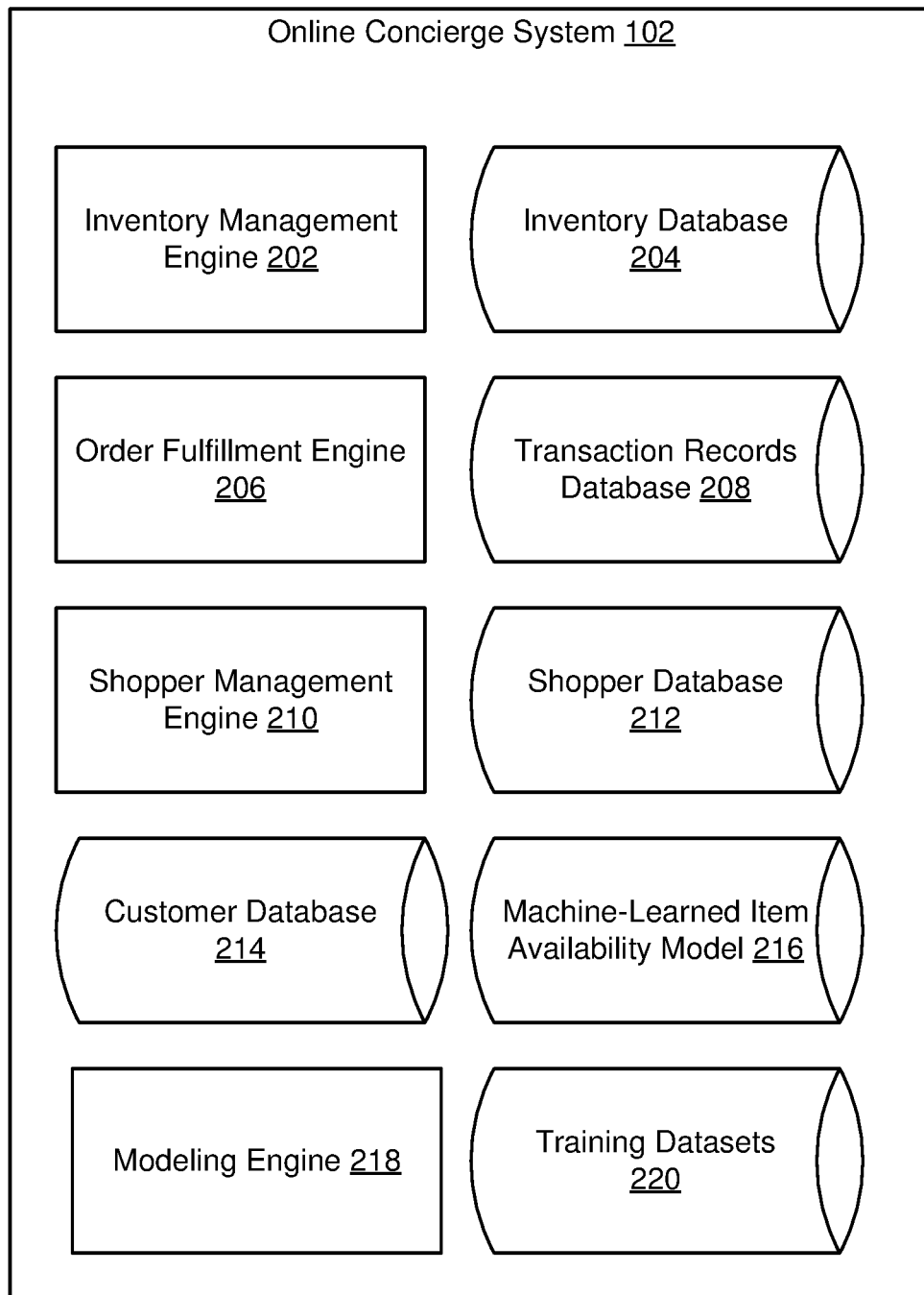
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIG. 4.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 maintains discrete time intervals for fulfilling orders and a user identifies a discrete time interval in an order, allowing the user to specify a time window when items from the order are delivered to the user. Additionally, items included in orders or a warehouse 110 identified by certain orders limit shoppers capable of fulfilling the certain orders to shoppers having one or more characteristics. For example, an order identifying a warehouse 110 limiting purchases to shoppers who have a membership to the warehouse 110 is unable to be fulfilled by shoppers who are not members of the warehouse 110. As another example, specific items (e.g. alcohol, prescription medication) in an order may be limited to being purchased by users who the online concierge system 102 authorizes to purchase the specific items, preventing an order including a specific item from being fulfilled by shoppers who are not authorized by the online concierge system 102 to purchase the specific item or to deliver the specific item. The order fulfillment engine 206 accounts for varying capabilities of shoppers with different characteristics to fulfill orders by applying one or more tags to a received order, where each tag corresponds to a different attribute of the order that identifies a characteristic of a shopper in some embodiments. Hence, for the online concierge system 102 to select a shopper to fulfill the order, the shopper has characteristics satisfying the tags applied 520 to the order.

The order fulfillment engine 206 also maintains a tree structure for each tag, with the tree structure for a tag encoding capability of shoppers to fulfill orders to which a tag is applied. The tree structure hierarchically arranges characteristics of shoppers for fulfilling orders corresponding to the tag, with different levels of the tree structure corresponding to different characteristics of the shopper. In various embodiments, shoppers having characteristics in a level of the tree structure for a tag are capable of fulfilling orders that shoppers in a higher level of the tree structure are capable of fulfilling, but are unable to fulfill orders that shoppers in a lower level of the tree structure are capable of fulfilling. For example, a tree structure for a tag corresponding to alcohol includes a level for shoppers who are not authorized to purchase or to deliver alcohol and an additional, lower level for shoppers who are authorized to purchase or to deliver alcohol; in this example, a shopper who is authorized to purchase or to deliver alcohol is also capable of making non-alcohol purchases. Similarly, a tree structure for a tag corresponding to membership in a warehouse 110 includes a level for shoppers who are not members of the warehouse 110 and an additional, lower level for shoppers who are members of the warehouse 110; in this example, shoppers who are members of the warehouse 110 are capable of purchasing items from the warehouse 110 and from warehouses 110 that do not require a membership, while shoppers who are not members of the warehouse 110 cannot purchase items from the warehouse 110. Each level in the hierarchy is also associated with a value, with lower levels in the tree structure having higher values in some embodiments, reflecting the ability of shoppers with characteristics in lower levels of the tree structure to also fulfill orders capable of being fulfilled by shoppers in higher levels of the tree structure. By maintaining tree structures for different tags, the order fulfillment engine 206 is capable of more easily adding additional tags to reflect additional shopper characteristics affecting order fulfillment by maintaining one or more additional tree structures corresponding to the additional tags. Similarly, the tree structures may be more easily modified to reflect changes in shopper characteristics affecting shopper capability of fulfilling orders with different attributes. The tree structures for characteristics of shoppers for order fulfillment are further described below in conjunction with FIGS. 5 and 6.

As further described below in conjunction with FIG. 5, the order fulfillment engine 206 accounts for characteristics of shoppers and tags identifying conditions for fulfilling orders identifying a discrete time interval when allocating shoppers to fulfill orders during discrete time intervals. The order fulfillment engine 206 leverages the tree structures for tags corresponding to orders to generate scores for various groups of estimated shoppers, where a group includes shoppers having one or more common characteristics, and selects estimated shoppers for a discrete time interval from a group for fulfilling an order specifying the identified time interval. For example, the order fulfillment engine 206 selects an estimated shopper in a group having characteristics satisfying tags assigned with the order and having a lowest score of groups having a combination of characteristics capable of fulfilling the order.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model that receives inputs an identifier of the user, an identifier of an item, and a time. and outputs a probability of the user corresponding to the identifier of the user purchasing an item corresponding to the identifier of the item at the time. The trained purchase model accounts for times when the user previously purchased an item, such as a relative time from when the user previously purchased the item to a time when the model is applied, as well as characteristics of the item (e.g., a type of the item, a quantity or an amount of the item that was previously purchased). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
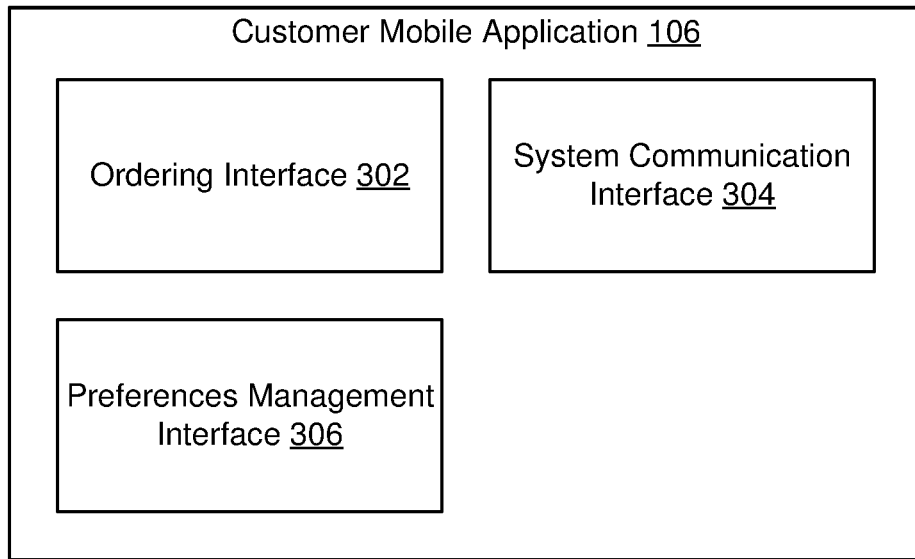
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
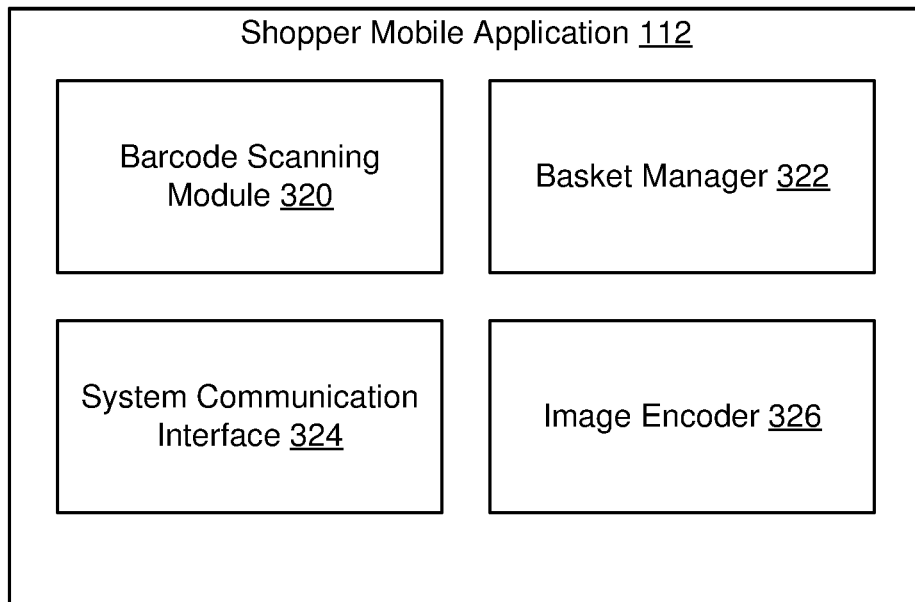
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
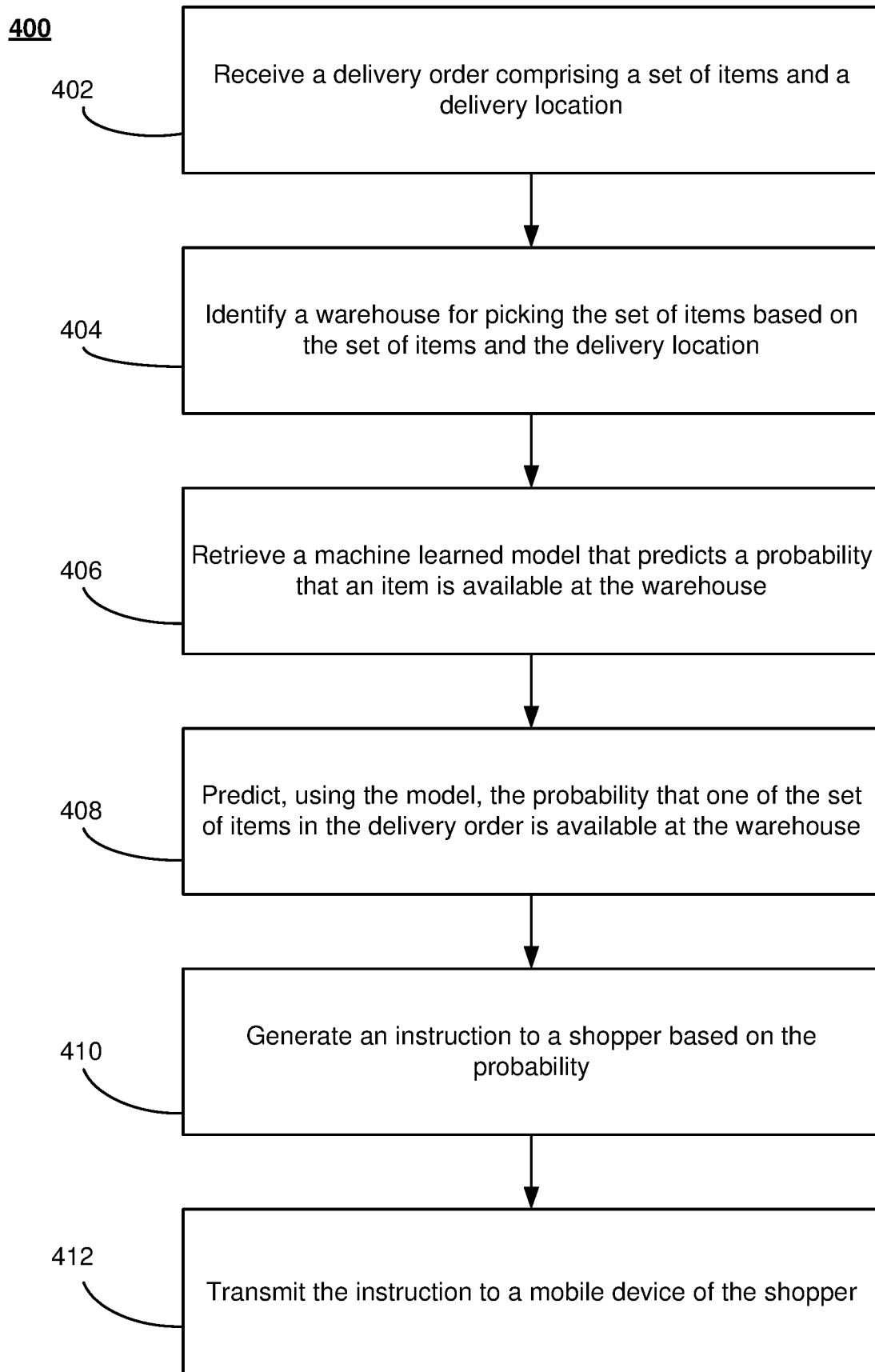
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a user based on the probability predicted by the machine-learned item availability model 216.

Figure 5:
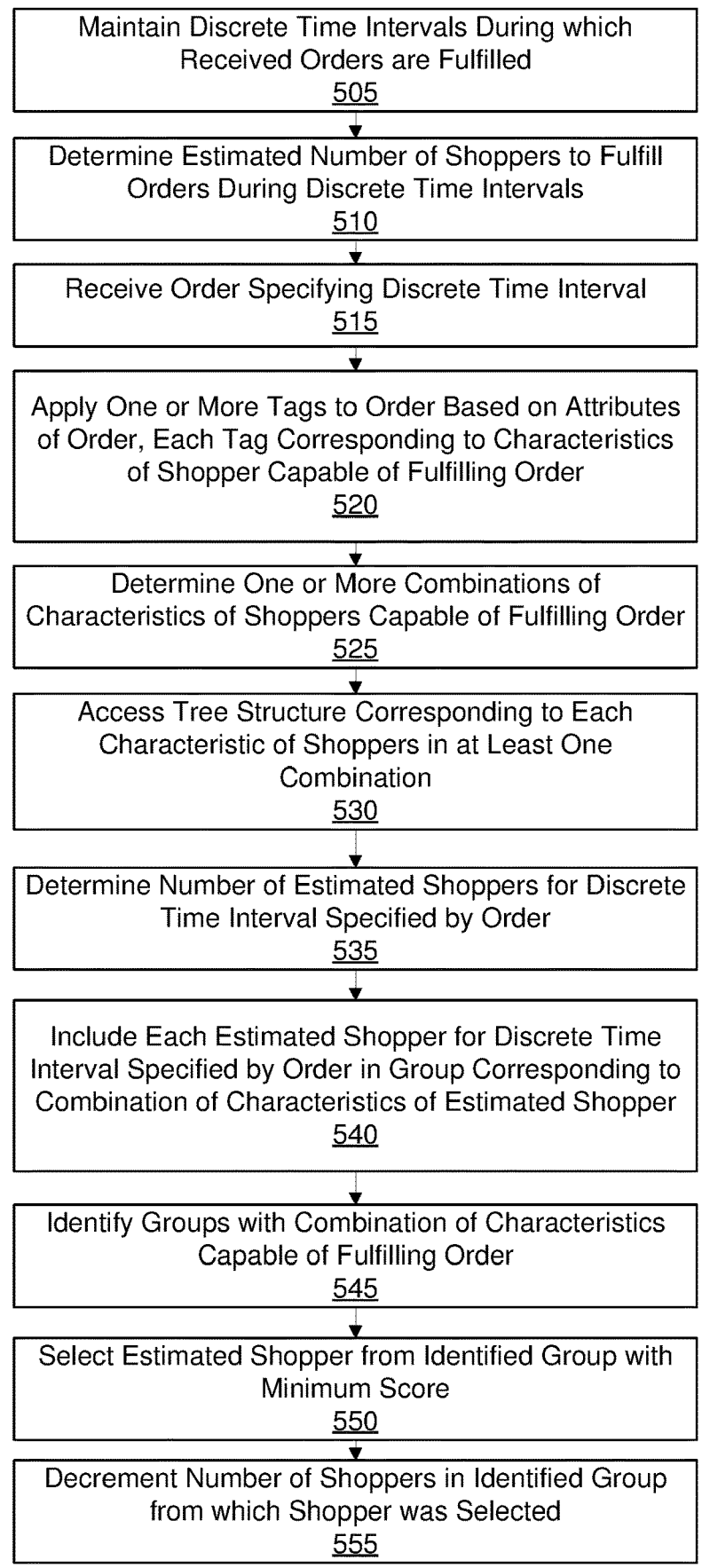
FIG. 5 is a flowchart of a method for selecting shoppers for fulfilling orders that accounts for restrictions of characteristics of shoppers capable of fulfilling received order, according to one embodiment.

Selecting Shoppers for Fulfilling Orders Accounting for Restrictions in Shoppers Capable of Fulfilling Orders FIG. 5 is a flowchart of one embodiment of a method for selecting shoppers for fulfilling orders that accounts for restrictions of characteristics of shoppers capable of fulfilling received orders. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

An online concierge system 102 maintains 505 a plurality of discrete time intervals during which orders received by the online concierge system are fulfilled. For example, the online concierge system 102 maintains 505 multiple two hour intervals for fulfilling orders. As an example, the online concierge system 102 partitions a day into discrete two hour intervals for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled. In some embodiments, the online concierge system 102 maintains a maximum interval and allows a user to select a discrete time interval that is within the maximum interval from a time when the order is received by the online concierge system 102 to limit how long in the future the user may schedule fulfillment of the order.

From previously fulfilled orders, the online concierge system 102 determines 510 an estimated number of shoppers available to fulfill orders during each of at least a set of the discrete time intervals. For example, the online concierge system 102 determines 510 an estimated number of shoppers available to fulfill orders during each of the discrete time intervals. In various embodiments, the online concierge system 102 applies a trained machine learned model to historical numbers of shoppers available to fulfill orders, or who fulfilled orders, at different discrete time intervals and characteristics of the discrete time interval (e.g., weekday or weekend, time of day, day of the week, day of the month, etc.), as well as a geographic location. To determine 510 the estimated number of shoppers, the trained machine learned model receives a discrete time interval and a geographic location and determines 510 the estimated number of shoppers available to fulfill orders during the discrete time interval based on historical numbers of shoppers available during prior time intervals corresponding to the discrete time interval, as well as the geographic location. The trained machine learned model for determining 510 the estimated number of shoppers during a discrete time interval may be trained using any suitable method or combination of methods (e.g., supervised learning, unsupervised learning, semi-supervised learning, etc.). In various embodiments, the online concierge system 102 determines 510 an estimated number of shoppers available to fulfill orders during each discrete time interval of a set. For example, the set of discrete time intervals includes each discrete time interval within the maximum interval from a current time.

In some embodiments, the online concierge system 102 maintains a specified percentage of shoppers to allocate per discrete time interval for fulfilling orders. Based on the specified percentage, the online concierge system 102 allocates the specified percentage of estimated shoppers for a discrete time interval for fulfilling orders specifying the discrete time interval. The specified percentage of estimated shoppers for a discrete time interval for fulfilling orders specifying the discrete time interval is less than 100%, with the remaining percentage of the estimated shoppers for the discrete time interval are allocated by the online concierge system 102 for fulfilling orders received during the discrete time interval and indicating short term fulfillment (i.e., fulfillment within a threshold amount of time from a time when the order was received). This allocation allows the online concierge system 102 to divide the number of estimated shoppers during the discrete time interval between orders received before the discrete time interval that specify fulfillment during the discrete time interval and orders received during the discrete time interval identifying short term fulfillment for fulfillment. In some embodiments, the specified percentage is constant for different discrete time intervals. For example, the specified percentage is 70%, so the online concierge system 102 allocates 70% of the estimated number of shoppers for the discrete time interval to fulfill orders received before the discrete time interval that specify fulfillment during the discrete time interval and allocates 30% of the estimated number of shoppers for the discrete time interval to fulfill orders indicating short term fulfillment and received during the discrete time interval. In other embodiments, the online concierge system 102 maintains different specified percentage for different discrete time intervals; for example, the online concierge system 102 maintains a specified percentage for discrete time intervals occurring within a portion of a day (e.g., a morning) and a different specified percentage for discrete time intervals occurring within a different portion of the day (e.g., an afternoon).

The online concierge system 102 receives 515 an order from a user that includes one or more items for purchase, identifies a warehouse 110 from which items of the order are to be obtained, and identifies a discrete time interval for fulfilling the order. Based on the warehouse 110 and items in the order, fulfillment of the order may be limited to shoppers having one or more characteristics. For example, the order includes an item (e.g., alcohol, medication) for which a shopper is required to have a stored authorization or approval by the online concierge system 102 to purchase or to deliver (also referred to as authorization or approval by the online concierge system 102 to "obtain" the item). As another example, the order identifies a warehouse 110 accessible to shoppers having a membership or affiliation with the warehouse 110 to purchase items from the warehouse 110. In other embodiments, the online concierge system 102 restricts fulfillment of orders to shoppers having any suitable characteristics or combinations of characteristics. Hence, the restriction on fulfilling an order encompasses a restriction on shoppers capable of purchasing a product from a warehouse 110 or a restriction on shoppers capable of delivering an item from a warehouse 110 to a location specified by an order.

From the items in the order and the warehouse identified by the order, the online concierge system 102 applies 520 one or more tags to the order. The tags applied 520 to the order identify attributes of the order. The attributes of the order are determined from the warehouse 110 specified by the order and items included in the order. The attributes of the order identify characteristics needed by a shopper to fulfill the order. Each tag corresponds to a different attribute of the order that identifies a characteristic of a shopper in some embodiments. Hence, for the online concierge system 102 to select a shopper to fulfill the order, the shopper has characteristics satisfying the tags applied 520 to the order. For example, if an order identifies a warehouse 110 requiring a membership to be accessed, a tag applied 520 to the order identifies the warehouse 110 and the membership. As another example, if an order includes alcohol, a tag applied 520 to the order indicates that a shopper be authorized by the online concierge system 102 to purchase alcohol or to deliver alcohol from a warehouse 110. In another example, an order identifies a warehouse 110 requiring a membership to be accessed and includes alcohol, so the online concierge system 102 applies 520 a tag to the order indicating that the shopper be authorized by the online concierge system 102 to purchase alcohol (or to deliver alcohol) and a tag identifying the warehouse 110 and the membership to the warehouse 110. Hence, any number of tags may be applied 520 to the order depending on the warehouse 110 identified by the order and items included in the order.

Figure 6:
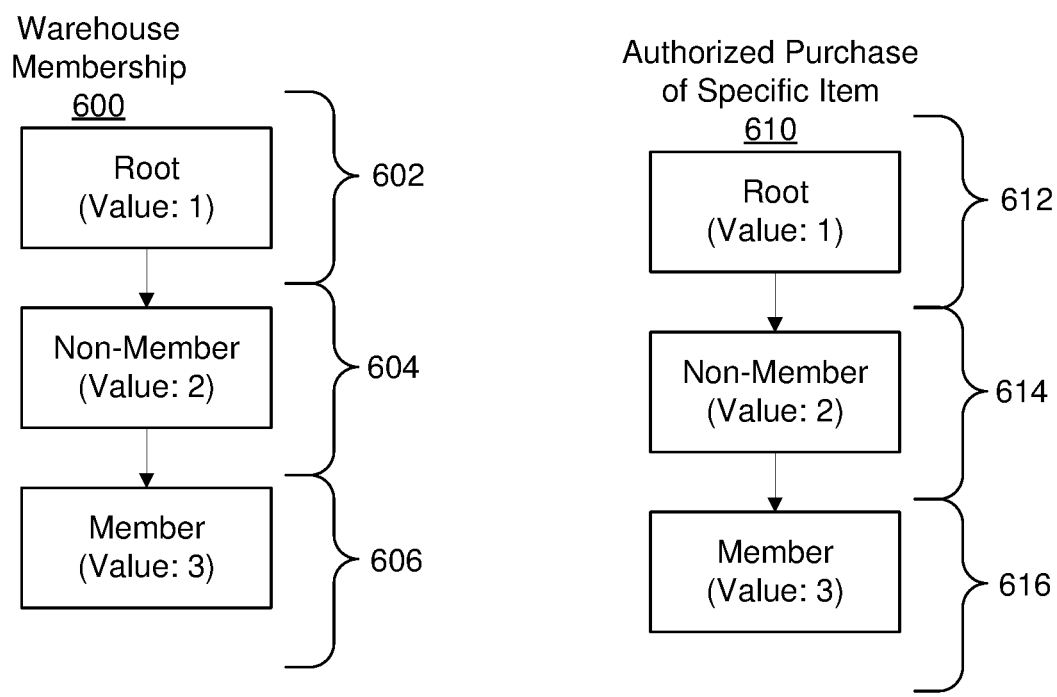
FIG. 6 is an example of tree structures for tags corresponding to characteristics of users maintained by an online concierge system, according to one embodiment.

The online concierge system 102 maintains a tree structure for each tag, with the tree structure for a tag encoding capability of shoppers to fulfill orders to which a tag is applied. The tree structure hierarchically arranges characteristics of shoppers for fulfilling orders corresponding to the tag, with different levels of the tree structure corresponding to different characteristics of the shopper. In various embodiments, shoppers having characteristics in a level of the tree structure for a tag are capable of fulfilling orders that shoppers in a higher level of the tree structure are capable of fulfilling, but are unable to fulfill orders that shoppers in a lower level of the tree structure are capable of fulfilling. FIG. 6 shows example tree structures for tags corresponding to characteristics of shoppers. Tree structure 600 in FIG. 6 corresponds to membership in a warehouse 110. Tree structure 600 includes a root level 602 and a lower level 604 for shoppers who are not members of the warehouse 110. An additional lower level 606 is lower than the lower level 604 and corresponds to shoppers who are members of the warehouse 110. In this example, shoppers who are members of the warehouse 110, corresponding to the additional lower level 606, are capable of purchasing items from the warehouse 110 and from warehouses 110 that do not require a membership (so a shopper included in the additional lower level 606 is capable of fulfilling orders that a shopper in the lower level 604 can fulfill), while shoppers who are not members of the warehouse 110, and are included in lower level 604, cannot purchase items from the warehouse 110 that shoppers in additional lower level 606 can fulfill. FIG. 6 also shows an example tree structure 610 tree structure for a tag corresponding to purchase or delivery of an item requiring authorization by the online concierge service to purchase or to deliver (e.g., alcohol or prescription medication). Tree structure 610 includes a root level 612 and a lower level 614 for shoppers who are not authorized by the online concierge system 102 to purchase or to deliver the specific item. An additional lower level 616 is lower than the lower level 614 and corresponds to shoppers who are authorized by the online concierge system 102 to purchase or to deliver the specific item. In this example, a shopper who is authorized to purchase or to deliver the specific item (e.g., alcohol) and is in the additional lower level 616 is also capable of making purchases or deliveries that shoppers who are not authorized to purchase or to deliver the specific item and are in the lower level 614 can make; however, a shopper in the lower level 614 is not capable of fulfilling an order including the specific item, while a shopper in the additional lower level 616 can fulfill such an order. While FIG. 6 depicts a tree structure, in other embodiments, the online concierge system 102 maintains any suitable hierarchical data structure identifying different characteristics of shoppers affecting ability of shoppers to fulfill orders.

Maintaining the tree structures for different tags allows the online concierge system 102 to more efficiently adjust capabilities of shoppers for fulfilling orders. For example, to add one or more characteristics to a tag, the online concierge system 102 adds another characteristic to a level of the tree structure for the tag or adds an additional level to the tree structure for the tag, allowing consideration of the additional one or more characteristics when allocating shoppers to fulfill orders without affecting the existing characteristics affecting fulfillment of orders associated with the tag. Similarly, the tree structures allow the online concierge system 102 to more readily adjust how a characteristic affects capability of a shopper for fulfilling orders. For example, the online concierge system 102 increases or decreases a value of a level in a tree structure corresponding to a tag or moves a characteristic to a different level in the tree structure to adjust an effect of the characteristic in shopper capability for fulfilling orders. In conventional techniques such changes would involve creation of new rules for shopper capabilities to fulfill orders and corresponding adjustments to existing rules to reflect the changed effect of a characteristic of the shopper, the tree structures can be readily modified, with the modified tree structures able to be quickly used for allocating shoppers to fulfill orders, as further described below.

Referring back to FIG. 5, each level in the hierarchy is also associated with a value, with lower levels in the tree structure having higher values in some embodiments, reflecting the ability of shoppers with characteristics in lower levels of the tree structure to also fulfill orders capable of being fulfilled by shoppers in higher levels of the tree structure. In the example of FIG. 6, root level 602 and root level 612 each have a value of 1, while lower level 604 and lower level 614 each have a value of 2. Further, additional lower level 606 and additional lower level 616 each have a value of 3. In other hierarchical structures, levels corresponding to characteristics of shoppers capable of fulfilling a greater number of orders have higher values. Thus, a higher value for a characteristic of a shopper indicates that a shopper with the characteristic is capable of fulfilling orders having a broader range of attributes.

Again referring to FIG. 5, the online concierge system 102 determines 525 one or more combinations of characteristics of shoppers capable of fulfilling the order and accesses 530 tree structures corresponding to each characteristic of shoppers included in at least one combination. For example, for an order identifying a warehouse 110 that does not require a membership to access and does not include a specific item for which a shopper be authorized by the online concierge system 102 to purchase or to deliver, the online concierge system 102 determines 525 that shoppers who are not members of a warehouse 110 and shoppers who are members of a warehouse 110 are capable of fulfilling the order and determines 525 that shoppers who are authorized to purchase or to deliver the specific item by the online concierge system 102 as well as shoppers who are not authorized to purchase or to deliver the specific item form the online concierge system 102 are capable of fulfilling the order. In the preceding example, the online concierge system 102 accesses 530 a tree structure corresponding to membership in the warehouse 110 and one or more tree structures for authorization by the online concierge system 102 to purchase or to deliver one or more specific items. In another example, an order identifies a warehouse 110 that requires a membership and a specific item requiring authorization by the online concierge system 102 to purchase or to deliver, so the online concierge system 102 determines 525 that shoppers who are members of the warehouse 110 and who are authorized by the online concierge system 102 to purchase or to deliver the specific item are capable of fulfilling the order; thus, the online concierge system 102 accesses 530 a tree structure for membership in the warehouse 110 and a tree structure for authorization by the online concierge system 102 to purchase the specific item.

The tree structures corresponding to different tags allows the online concierge system 102 to better account for combinations of characteristics of shoppers when allocating shoppers to fulfill an order. Conventional techniques that hard code rules for allocating shoppers to orders are cumbersome and inefficient to implement to account for relative capabilities of shoppers with different characteristics to fulfill orders, with many conventional rules focusing on effects of a specific characteristic of a shopper in capability of the shopper fulfilling orders without accounting for effects of a combination of multiple characteristics of a shopper affecting orders capable of being fulfilled by the shopper. The tree structures maintained by the online concierge system 102 allow the online concierge system 102 to more readily account for effects of multiple characteristics of a shopper on the shopper's capability to fulfill orders, providing a more efficient and accurate assessment of a shopper's capability for fulfilling various orders.

Additionally, the online concierge system 102 determines 535 a number of estimated shoppers available to fulfill orders during the discrete time interval identified by the order from the estimated shoppers determined 510 to be available to fulfill orders during the discrete time interval. The online concierge system 102 includes 540 each estimated shoppers available to fulfill orders during the discrete time interval into a group based on characteristics of each estimated shopper available to fulfill an order during the discrete time interval. Each group corresponds to a combination of characteristics of a shopper. For example, a group corresponds to a shopper being a member of a warehouse 110 identified by the order and being authorized by the online concierge system 102 to purchase or to deliver a specific item; another group corresponds to a shopper not being a member of the warehouse 110 identified by the order and being authorized by the online concierge system 102 to purchase or to deliver a specific item, while another group corresponds to a shopper being a member of the warehouse 110 and not being authorized by the online concierge system 102 to purchase or to deliver the specific item. Additionally, each group has a score based on the combination of characteristics corresponding to the group, with the score determined from values of levels in obtained tree structures corresponding to the tags applied 520 to the order. In various embodiments, the online concierge system 102 identifies a level in a tree structure for a tag applied 520 to the order that includes characteristics of shoppers capable of fulfilling the order and retrieves a value corresponding to the identified level. The online concierge system 102 combines values of levels in each tree structure corresponding to a tag applied to the order 520 including a characteristics of shoppers in a group to determine the score for the group. For example, the score for a group is a product of values of levels in each tree structure corresponding to a tag applied to the order 520 including a characteristics of shoppers in the group. However, in other embodiments, the online concierge system 102 generates the score for a group by combining values of levels in each tree structure corresponding to a tag applied to the order 520 including a characteristics of shoppers in the group in any suitable manner in other embodiments.

If the online concierge system 102 modifies a tree structure the online concierge system, when the online concierge system 102 subsequently generates an updated score for each group including a tag corresponding to the modified tree structure. The online concierge system 102 uses the updated scores for the groups including the tag corresponding to the modified tree structure when selecting shoppers to fulfill orders associated with the tag, as further described below. For example, the online concierge system 102 adds one or more additional characteristics to the modified tree structure to identify other characteristics of the shopper capable of fulfilling the order including the tag by adding the additional characteristics to a level of the tree structure or by adding one or more levels to the tree structure. Similarly, the online concierge system 102 may modify the tree structure by removing characteristics from one or more levels of the tree structure. In another example, the online concierge system 102 increases or decreases a value of a level in the tree structure to reflect a change in capability of shoppers having characteristics corresponding to the level of the tree structure to fulfill orders. By generating scores for groups based on values of levels of tree structures corresponding to tags applied to the orders, the online concierge system is capable of quickly accounting for changes in order fulfillment for characteristics of shoppers through a modified tree structure for a tag to create a modified score for a group including the tag from the modified tree structure and using the modified score for the group when selecting estimated shoppers to fulfill a subsequently received order, reducing time and computational resources for the online concierge system 102 to account for changes in characteristics of shoppers capable of fulfilling orders. This increased scalability and adaptability allows the online concierge system 102 to more efficiently allocate computational resources and time to adjust or alter how characteristics of shoppers affect capability of the shopper to fulfill orders with various tags.

The online concierge system 102 identifies 540 one or more groups having a combination of characteristics capable of fulfilling the order from the tags applied to the order and selects 550 an estimated shopper from an identified group having a minimum score to fulfill the order. As shoppers with characteristics in lower levels of tree structures, which have higher values in the tree structures, are also capable of fulfilling orders that shoppers with characteristics in higher levels of tree structures are capable of fulfilling, the shoppers with characteristics in lower levels of tree structures are capable of fulfilling a wider range of orders. Hence, estimated shoppers in groups with higher scores are shoppers with a greater capability of fulfilling orders to which different tags or combinations of tags are applied 520. For example, referring to the example in FIG. 6, a group corresponding to shoppers who are members of a warehouse 110 and who are authorized by the online concierge system 102 to purchase or to deliver the specific item has a score of 9, which is a product of 3, the value for the additional lower level 606, and 3, the value for the additional lower level 616; similarly, a group corresponding to shoppers who are not members of a warehouse 110 and who are authorized to purchase or to deliver the specific item has a score of 6, which is a product of 2, the value for the lower level 605, and 3, the value of the additional lower level 616. Hence, by selecting 550 an estimated shopper from an identified group with a minimum score to fulfill the order, the online concierge system 102 initially selects 550 estimated shoppers with more limited capabilities to fulfill orders. This allows the online concierge system 102 a greater flexibility in fulfilling subsequent orders by reserving estimated shoppers in groups with higher scores, corresponding to greater capabilities to fulfill orders, for subsequent selection to fulfill other orders.

In response to selecting 550 the estimated shopper from the identified group having the minimum score to fulfill the order, the online concierge system 102 decrements 555 the number of estimated shoppers in the identified group. This allows the online concierge system 102 to account for the reduced number of estimated shoppers in the identified group when selecting shoppers for fulfilling other orders. By decrementing 555 the number of estimated shoppers in the identified group for the discrete time interval from the order, the online concierge system 102 more accurately identifies discrete time intervals during which orders may be fulfilled by accounting for estimated numbers of shoppers with characteristics capable of fulfilling orders with different attributes during different discrete time intervals rather than an overall number of estimated number of shoppers available during the different discrete time intervals. As further described above, the tree structures maintained by the online concierge system 102 for various tags allow the online concierge system 102 to more efficiently and accurately account for combinations of characteristics of shoppers affecting capabilities of the shoppers to fulfill various orders. This increased accuracy in identifying estimated shoppers capable of fulfilling orders reduces a likelihood of a user receiving an order late or selecting an order for fulfillment during a time interval when there are not shoppers having characteristics capable of fulfilling the order.

In some embodiments, the online concierge system 102 determines estimated numbers of shoppers for the discrete time interval specified by the order in each group capable of fulfilling orders having tags associated with the received order when the order is received 515. In response to determining that each group capable of fulfilling orders having tags associated with the received order includes less than a threshold number of shoppers during the discrete time interval, the online concierge system 102 transmits a prompt to a client device of the shopper to select an alternative discrete time interval. This allows the online concierge system 102 to proactively account for numbers of shoppers capable of fulfilling the order during the discrete time interval based on attributes of the order and indicate to the user that the order is unable to be fulfilled during the discrete time interval, enabling the user to adjust the discrete time interval for fulfilling the order before finalizing the order. In some embodiments, the prompt identifies a set of groups that each have a combination of characteristics capable of fulfilling the order from the tags applied to the order to simplify selection of an alternative discrete time interval by the user.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, performed by one or more processors of an online concierge system, the method comprising:

maintaining, in a data store at an online concierge system, a plurality of discrete time intervals for fulfilling orders received by the online concierge system;

receiving, by the online concierge system, an order from a client device of a user over a network, the order including one or more items, a warehouse located at a geographic location, and specifying a discrete time interval;

applying, by the one or more processors of the online concierge system, a machine learning model to the geographic location of the warehouse and the discrete time interval to determine an estimated number of shoppers, wherein the machine learning model is trained and periodically retrained by one or more processors of a training system, wherein training the machine learning model comprises performing, by the one or more processors of the training system, a training process comprising:

applying a set of training data describing historical numbers of shoppers available during the plurality of discrete time intervals to the machine learning model, and adjusting weights of the machine learning model based on the applying of the set of training data to the machine learning model, and wherein periodically retraining the machine learning model comprises performing, by the one or more processors of the training system, a training process comprising:

using the trained machine learning model to obtain an additional set of training data by applying the machine learning model to a plurality of discrete time intervals for a period of time, the additional set of training data describing numbers of shoppers available during the plurality of discrete time intervals in the period of time, applying the additional set of training data to the machine learning model, and adjusting parameters of the machine learning model based on the applying of the additional set of training data to the machine learning model;

applying, by the one or more processors of the online concierge system, one or more tags to the received order based on the warehouse identified by the order and the one or more items included in the order, the one or more tags identifying attributes of the order identifying characteristics of shoppers capable of fulfilling the order;

determining, by the one or more processors of the online concierge system, one or more combinations of characteristics of shoppers capable of fulfilling the order;

for each tag included in a determined combination, accessing, by the one or more processors of the online concierge system, a tree structure encoding capability of shoppers fulfilling orders into a plurality of levels, each level in the plurality of levels having a value and corresponding to characteristics of shoppers;

for each of the number of estimated shoppers, identifying, by the one or more processors of the online concierge system, characteristics of the estimated shopper;

grouping, by the one or more processors of the online concierge system, the number of estimated shoppers into a plurality of groups based on the identified characteristics;

for each of the plurality of groups, determining, by the one or more processors of the online concierge system, a score based on a combination of characteristics of estimated shoppers in the group, the score computed based on a combination of values of levels in the one or more tree structures corresponding to the combination of characteristics of each estimated shopper in the group;

identifying, by the one or more processors of the online concierge system, one or more groups in the plurality of groups having a combination of characteristics capable of fulfilling the order from the tags applied to the order;

selecting, by the one or more processors of the online concierge system, an estimated shopper from an identified group having a minimum score to fulfill the order;

dispatching, by the online concierge system, the selected shopper for fulfilling the order, wherein dispatching the selected shopper comprises transmitting, over the network, the order to a client device associated with the selected shopper for fulfilling the order, wherein the dispatching causes the client device to display the order to the selected shopper for fulfillment; and decrementing a number of estimated shoppers in the identified group having the minimum score in response to the dispatching.

2. The method of claim 1, wherein the score for a group comprises a product of values corresponding to levels in each of the one or more tree structures including a characteristic of the combination of characteristics.

3. The method of claim 1, wherein a characteristic of a shopper indicates whether the shopper is a member of a warehouse identified by the order.

4. The method of claim 1, wherein a characteristic of a shopper identifies a specific item and indicates whether the shopper is authorized by the online concierge system to purchase or to deliver the specific item.

5. The method of claim 4, wherein the specific item is selected from a group consisting of: alcohol and prescription medication.

6. The method of claim 1, wherein receiving the order from the user of the online concierge system including one or more items and specifying the discrete time interval comprises:

determining an estimated number of estimated shoppers for the discrete time interval in each of the identified one or more groups; and responsive to determining each of the identified one or more groups includes less than a threshold number of estimated shoppers, transmitting a prompt to a client device of the user to select an alternative discrete time interval.

7. The method of claim 6, wherein the prompt identifies a set of alternative discrete time intervals each including at least one group having the combination of characteristics capable of fulfilling the order from the tags applied to the order.

8. A computer program product comprising a non-transitory computer readable storage medium having instructions encoded thereon that, when executed by one or more processors, cause the processor to:

maintain, in a data store at an online concierge system, a plurality of discrete time intervals for fulfilling orders received by the online concierge system;

receive an order from a client device of a user over a network, the order including one or more items, a warehouse located at a geographic location, and specifying a discrete time interval;

apply a machine learning model to the geographic location of the warehouse and the discrete time interval to determine an estimated number of shoppers, wherein the machine learning model is trained and periodically retrained by one or more processors of a training system, wherein training the machine learning model comprises performing, by the one or more processors of the training system, a training process comprising:

applying a set of training data describing historical numbers of shoppers available during the plurality of discrete time intervals to the machine learning model, and adjusting weights of the machine learning model based on the applying of the set of training data to the machine learning model, and wherein periodically retraining the machine learning model comprises performing, by the one or more processors of the training system, a retraining process comprising:

using the trained machine learning model to obtain an additional set of training data by applying the machine learning model to a plurality of discrete time intervals for a period of time, the additional set of training data describing numbers of shoppers available during the plurality of discrete time intervals in the period of time, applying the additional set of training data to the machine learning model, and adjusting parameters of the machine learning model based on the applying of the additional set of training data to the machine learning model;

apply one or more tags to the received order based on the warehouse identified by the order and the one or more items included in the order, the one or more tags identifying attributes of the order identifying characteristics of shoppers capable of fulfilling the order;

determine one or more combinations of characteristics of shoppers capable of fulfilling the order;

for each tag included in a determined combination, accessing a tree structure encoding capability of shoppers fulfilling orders into a plurality of levels, each level in the plurality of levels having a value and corresponding to characteristics of shoppers;

for each of the number of estimated shoppers, identifying characteristics of the estimated shopper;

group the number of estimated shoppers into a plurality of groups based on the identified characteristics;

for each of the plurality of groups, determining a score based on a combination of characteristics of estimated shoppers in the group, the score computed based on a combination of values of levels in the one or more tree structures corresponding to the combination of characteristics of each estimated shopper in the group;

identify one or more groups in the plurality of groups having a combination of characteristics capable of fulfilling the order from the tags applied to the order;

select an estimated shopper from an identified group having a minimum score to fulfill the order;

dispatch, by the online concierge system, the selected shopper for fulfilling the order, wherein dispatching the selected shopper comprises transmitting, over the network, the order to a client device associated with the selected shopper for fulfilling the order, wherein the dispatching causes the client device to display the order to the selected shopper for fulfillment; and decrement a number of estimated shoppers in the identified group having the minimum score in response to the dispatching.

9. The computer program product of claim 8, wherein the score for a group comprises a product of values corresponding to levels in each of the one or more tree structures including a characteristic of the combination of characteristics.

10. The computer program product of claim 8, wherein a characteristic of a shopper indicates whether the shopper is a member of a warehouse identified by the order.

11. The computer program product of claim 8, wherein a characteristic of a shopper identifies a specific item and indicates whether the shopper is authorized by the online concierge system to purchase or to deliver the specific item.

12. The computer program product of claim 11, wherein the specific item is selected from a group consisting of: alcohol and prescription medication.

13. The computer program product of claim 8, wherein receive the order from the user of the online concierge system including one or more items and specifying the discrete time interval comprises:

determine an estimated number of shoppers for the discrete time interval in each of the identified one or more groups; and responsive to determining each of the identified one or more groups includes less than a threshold number of estimated shoppers, transmit a prompt to a client device of the user to select an alternative discrete time interval.

14. The computer program product of claim 8, wherein the non-transitory computer readable storage medium further has instructions encoded thereon that, when executed by the processor, cause the processor to:

modify a tree structure of a tag included in the determined combination;

generate a modified score for a group including the tag having the modified tree structure, the modified score determined from the modified tree structure;

receive an additional order to which the tag having the modified tree structure is applied; and select an estimated shopper to fulfill the additional order based on the modified score and scores for other groups having a combination of characteristics capable of fulfilling the additional order from the tags applied to the additional order.

15. The computer program product of claim 13, wherein the prompt identifies a set of alternative discrete time intervals each including at least one group having the combination of characteristics capable of fulfilling the order from the tags applied to the order.

16. A computer system, comprising one or more processors and a non-transitory computer readable storage medium having instructions encoded thereon that, when executed by the one or more processors, cause the processor to:

maintain, in a data store at an online concierge system, a plurality of discrete time intervals for fulfilling orders received by the online concierge system;

receive, by the online concierge system, an order from a client device of a user over a network, the order including one or more items, a warehouse located at a geographic location, and specifying a discrete time interval;

apply a machine learning model to the geographic location of the warehouse and the discrete time interval to determine an estimated number of shoppers, wherein the machine learning model is trained and periodically retrained by one or more processors of a training system, wherein training the machine learning model comprises performing, by the one or more processors of the training system, a training process comprising:

applying a set of training data describing historical numbers of shoppers available during the plurality of discrete time intervals to the machine learning model, and adjusting weights of the machine learning model based on the applying of the set of training data to the machine learning model, and wherein periodically retraining the machine learning model comprises performing, by the one or more processors of the training system, a retraining process comprising:

using the trained machine learning model to obtain an additional set of training data by applying the machine learning model to a plurality of discrete time intervals for a period of time, the additional set of training data describing numbers of shoppers available during the plurality of discrete time intervals in the period of time, applying the additional set of training data to the machine learning model, and adjusting parameters of the machine learning model based on the applying the additional set of training data to the machine learning model;

apply one or more tags to the received order based on the warehouse identified by the order and the one or more items included in the order, the one or more tags identifying attributes of the order identifying characteristics of shoppers capable of fulfilling the order;

determine one or more combinations of characteristics of shoppers capable of fulfilling the order;

for each tag included in a determined combination, accessing a tree structure encoding capability of shoppers fulfilling orders into a plurality of levels, each level in the plurality of levels having a value and corresponding to characteristics of shoppers;

for each of the number of estimated shoppers, identifying characteristics of the estimated shopper;

group the number of estimated shoppers into a plurality of groups based on the identified characteristics;

for each of the plurality of groups, determining a score based on a combination of characteristics of estimated shoppers in the group, the score computed based on a combination of values of levels in the one or more tree structures corresponding to the combination of characteristics of each estimated shopper in the group;

identify one or more groups in the plurality of groups having a combination of characteristics capable of fulfilling the order from the tags applied to the order;

select an estimated shopper from an identified group having a minimum score to fulfill the order;

dispatch the selected shopper for fulfilling the order, wherein dispatching the selected shopper comprises transmitting, over the network, the order to a client device associated with the selected shopper for fulfilling the order, wherein the dispatching causes the client device to display the order to the selected shopper for fulfillment; and decrement a number of estimated shoppers in the identified group having the minimum score in response to the dispatching.

17. The computer system of claim 16, wherein the score for a group comprises a product of values corresponding to levels in each of the one or more tree structures including a characteristic of the combination of characteristics.

18. The computer system of claim 16, wherein a characteristic of a shopper indicates whether the shopper is a member of a warehouse identified by the order.

19. The computer system of claim 16, wherein a characteristic of a shopper identifies a specific item and indicates whether the shopper is authorized by the online concierge system to purchase or to deliver the specific item.

20. The computer system of claim 19, wherein the specific item is selected from a group consisting of: alcohol and prescription medication.

21. The computer system of claim 16, wherein receiving the order from the user of the online concierge system including one or more items and specifying the discrete time interval comprises:

determining an estimated number of estimated shoppers for the discrete time interval in each of the identified one or more groups; and responsive to determining each of the identified one or more groups includes less than a threshold number of estimated shoppers, transmitting a prompt to a client device of the user to select an alternative discrete time interval.

22. The computer system of claim 21, wherein the prompt identifies a set of alternative discrete time intervals each including at least one group having the combination of characteristics capable of fulfilling the order from the tags applied to the order.

* * * * *